United States Patent [19]

Nasu et al.

[11] Patent Number: 5,326,637
[45] Date of Patent: Jul. 5, 1994

[54] MAGNETIC RECORDING MEDIUM HAVING A CO-O MAGNETIC LAYER, AND SPECIFIED IN-PLANE PROPERTIES

[76] Inventors: Shogo Nasu, 322-204, 1-ban, Kitaochiai 1-chome, Suma-ku, Kobe-shi, Hyogo-ken; Koji Saiki, Lune-Toyonaka 121, 6-1, Kitajo-cho 4-chome, Toyonaka-shi, Osaka-fu, both of Japan

[21] Appl. No.: 24,109

[22] Filed: Feb. 23, 1993

Related U.S. Application Data

[63] Continuation of Ser. No. 655,698, Feb. 14, 1991, abandoned.

[30] Foreign Application Priority Data

| Feb. 19, 1990 | [JP] | Japan | 2-39199 |
| Sep. 7, 1990 | [JP] | Japan | 2-238688 |
| Dec. 28, 1990 | [JP] | Japan | 2-416992 |
| Jan. 23, 1991 | [JP] | Japan | 3-024090 |

[51] Int. Cl.$^5$ ............................................. G11B 5/00
[52] U.S. Cl. .............................. 428/336; 428/694 T; 428/694 TS; 428/694 TP; 428/900; 427/128; 427/131; 427/132; 204/192.2
[58] Field of Search ................ 428/694, 900, 611, 668, 428/928, 679, 336, 694 T, 694 TS, 694 TP; 204/192.2; 427/128, 131, 132

[56] References Cited

U.S. PATENT DOCUMENTS

| 4,743,348 | 5/1988 | Ando et al. | 204/192.2 |
| 4,797,330 | 1/1989 | Nasu et al. | 428/694 |
| 5,024,854 | 6/1991 | Nakamura et al. | 427/38 |
| 5,066,552 | 11/1991 | Howard | 428/694 |

OTHER PUBLICATIONS

"Thin Evaporated Films with High Coercive Force", IEEE Transactions On Magnetics, vol. Mag-3, No. 3, Sep. 1967.
"Evaporation Conditions and Magnetic Properties of Co-O Perpendicular Magnetic Films", IEEE Transactions on Magnetics, vol. Mag-20, No. 5 Sep. 1984.
"A New Perpendicular Magnetic Film of Co-O by Evaporation", Japanese Journal of Applied Physics, vol. 23, No. 6, Jun. 1984, pp. L397-L399.

*Primary Examiner*—Stevan A. Resan
*Attorney, Agent, or Firm*—Armstrong, Westerman, Hattori, McLeland & Naughton

[57] ABSTRACT

A magnetic recording medium is disclosed, wherein a magnetic film comprising a partially oxidized cobalt with its in-plane coercive force not less than 500 Oe is provided on a substrate. Further disclosed are megnetic recording media, wherein there is further provided an underlayer comprising Cr, Fe or an Fe-Co alloy under said magnetic film, and wherein a perpendicular magnetic anisotropic film comprising a partially oxidized metal is further provided on said magnetic film. The magnetic recording media of the present invention are high in recording density and reproduction output, low in noise and high in S/N ratio.

12 Claims, 4 Drawing Sheets

MAGNETIC RECORDING MEDIUM HAVING A CO-O MAGNETIC LAYER, AND SPECIFIED IN-PLANE PROPERTIES

This application is a continuation of application Ser. No. 07/655,698 filed Feb. 14, 1991 now abandoned.

BACKGROUND OF THE INVENTION

1. Field of the Invention

The present invention relates to a magnetic recording medium capable of high-density recording and, more particularly, to a magnetic recording medium suitable for flexible discs, magnetic tapes or hard discs and a preparing method thereof.

2. Description of the Prior Art

Hitherto, a Co-Cr alloy film, a partially oxidized film of cobalt, a partially oxidized film of Fe-Co alloy or the like have been proposed as a perpendicular magnetic recording medium capable of high-density magnetic recording. Such partially oxidized films have a high perpendicular magnetic anisotropy, are capable of high-density recording and have a high resistance to sliding of the head. Such partially oxidized films are obtainable by vapor deposition in an oxygen atmosphere or by reactive sputtering, also in an oxygen atmosphere.

As a recording-reproducing head for the perpendicular magnetic recording medium, there have been proposed heads of main magnetic exciting type and of ring type. Unlike the former, the latter has an advantage in that a relatively high reproduction output is obtainable even if it is provided with only a perpendicularly magnetized film without any soft magnetic underlayer such as permalloy and is, therefore, highly effective.

There are, however, problems in that if recording is made on a single layer of perpendicularly magnetized film and reproduction of the recorded information is made, the waveform is bound to the double-humped, and therefore, the reproduced output in the low-density region is bound to be low. Another problem is that the perpendicular magnetic recording medium comprising a film of partially oxidized cobalt is low in reproduction output compared with the medium comprising a film of Co-Cr alloy.

Meanwhile, there is a problem that a system representing a combination of a perpendicular magnetic recording media comprising films of partially oxidized Fe-Co alloy and partially oxidized cobalt with a ring type head is lower in reproduction output than that comprising the Co-Cr alloy film. To be noted particularly is that if the perpendicular magnetic anisotropy is raised for an increased recording density, it is bound to result in a decrease of the reproduction output. That is, if recording is made on a single layer of Co-Cr medium and the recorded information is reproduced by an Mn-Zn ferrite head, a standardized output of approximately 100 $\mu$Vo-p/mm/(m/sec)/turn is expected, that of the partially oxidized Fe-Co alloy medium is only 50 $\mu$Vo-p/mm/(m/sec) turn or so.

In order to overcome these problems, a method for providing as an underlayer a film of Fe-Co alloy or the like having magnetic anisotropy oriented in an in-plane direction has been proposed. Such a method, though largely increasing the reproduction output and the recording density, is not yet sufficient in respect of S/N ratio, overwrite property and the like.

SUMMARY OF THE INVENTION

The principal object of the present invention is to provide a magnetic recording medium high in recording density and reproduction output, low in noise and high in S/N ratio.

Other objects and advantages of the present invention will become apparent to those skilled in the art from a reading of the detailed description below.

The present inventors have completed the present invention through the discovery, after intensive study and research, of the fact that the aforementioned objects are attainable by a type of recording medium wherein a magnetic film comprising a partially oxidized film of cobalt high in in-plane coercive force not less than 500 Oe isotropically is provided on a substrate, another type of recording medium wherein an under layer comprising Cr, Fe or an Fe-Co alloy is further provided under the aforementioned magnetic film, or still another type of recording medium wherein a film of perpendicular magnetic anisotropy comprising a partially oxidized cobalt, a partially oxidized Fe-Co alloy or the like is further provided on the aforementioned magnetic film.

DETAILED DESCRIPTION OF THE PREFERRED EMBODIMENTS

Figure 1:
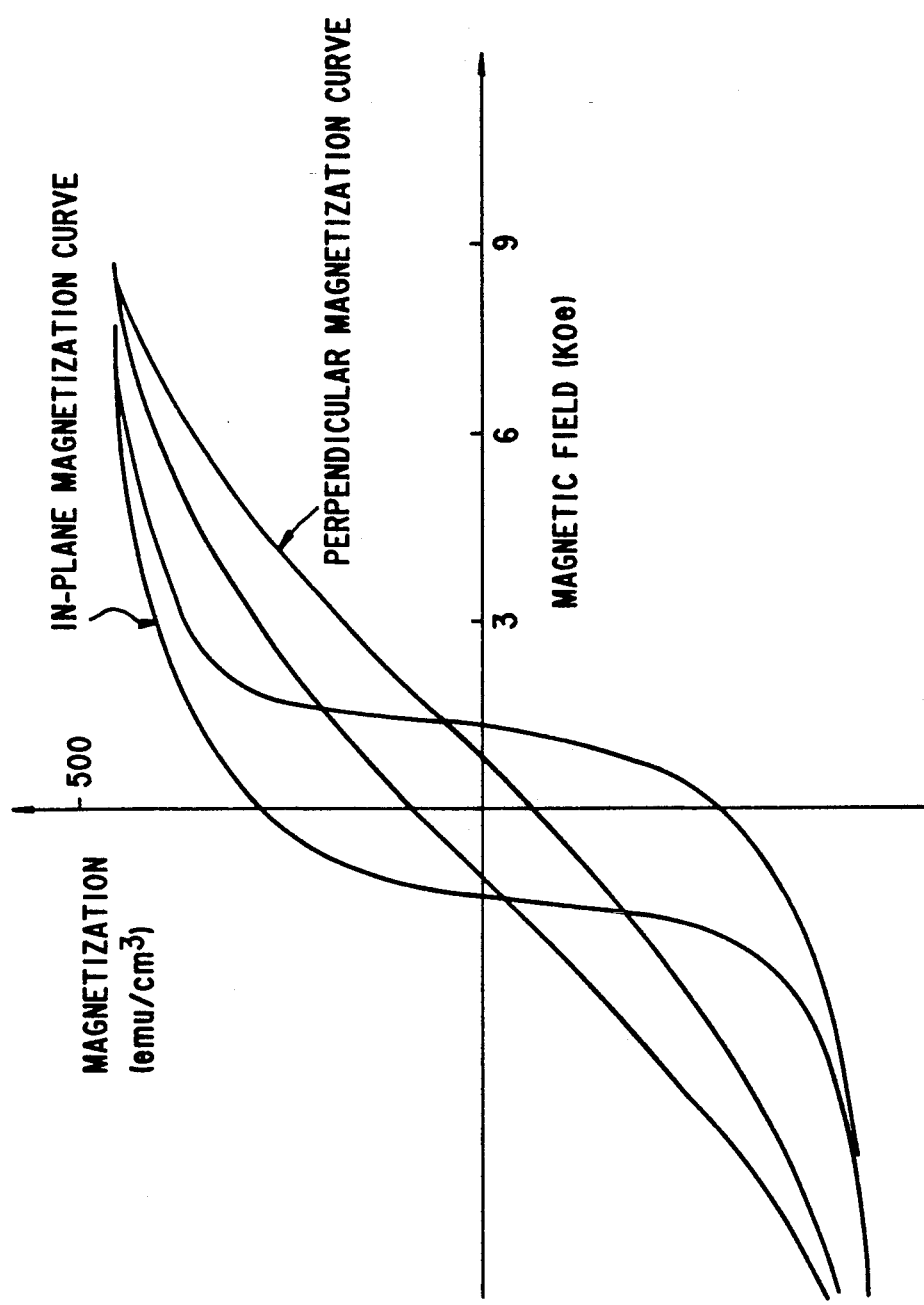
FIG. 1 shows a magnetization curve for a film of partially oxidized cobalt prepared in Example 1 of the present invention.

The present invention is, in a first aspect, directed to provide a type of magnetic recording medium, wherein a magnetic film comprising a film of partially oxidized cobalt with its isotropic in-plane coercive force not less than 500 Oe, preferably not less than 1000 Oe, is provided on a substrate.

The present invention is, in a second aspect, directed to provide another type of magnetic recording medium, wherein under the aforementioned magnetic film comprising a film of partially oxidized cobalt, an underlayer comprising Cr, Fe or an Fe-Co alloy is further provided.

The present invention is, in a third aspect, directed to provide still another type of magnetic recording medium, wherein on the aforementioned magnetic film comprising a film of partially oxidized cobalt, a film of perpendicular magnetic anisotropy comprising a partially oxidized metal is further provided.

The present invention is, in a fourth aspect, directed to provide a method for preparing a magnetic recording medium, wherein a magnetic film comprising a film of partially oxidized cobalt of not less than 500 Oe, preferably 1000 Oe, in isotropic in-plane coercive force is formed by sputtering substantially perpendicularly onto a substrate under a pressure not more than 5 mTorr.

The present invention is, in a fifth aspect, directed to provide another method for preparing a magnetic recording medium, wherein an underlayer comprising Cr, Fe or an Fe-Co alloy is formed on a substrate by sputtering substantially perpendicularly onto the substrate, prior to the deposition of the aforementioned magnetic film.

The present invention is, in a sixth aspect, directed to provide a still another method for preparing a magnetic recording medium, wherein the aforementioned magnetic film comprising a partially oxidized cobalt is first deposited by sputtering and then a perpendicular magnetic anisotropic film comprising a partially oxidized metal is formed thereon by sputtering.

The magnetic recording medium of the present invention is prepared by sputtering, in particular, by a so-called magnetron sputtering method.

As the substrate used in the present invention, there are included a plate, sheet or film of an organic polymer such as polyester and polyimide, a plate of aluminum, stainless steel or the like, a glass plate and so forth, having a thickness of from 10 μm to several millimeters.

The film of partially oxidized cobalt (Co-O) as a magnetic film in the present invention will now be described. This magnetic film is obtainable by reactive sputtering in an oxygen atmosphere with metallic cobalt as a target or by sputtering with a mixture of metallic cobalt (Co) and cobalt oxide (CoO) as a target. As a practical sputtering method, DC magnetron sputtering method and high-frequency magnetron sputtering method are known. The film of partially oxidized cobalt high in in-plane coercive force in the present invention is obtainable by the high-frequency sputtering method. A magnetic film of higher in-plane coercive force is obtainable under a lower sputtering gas pressure, especially by low-pressure high-frequency magnetron sputtering method. When the sputtering gas pressure is raised or the DC magnetron sputtering method is used, the perpendicular magnetic anisotropy is increased and the in-plane coercive force is decreased. There is no particular limitation with regard to substrate temperature, but it is a feature of the present invention that a magnetic film high in in-plane coercive force is obtainable rather at room temperature. A substantially equal in-plane coercive force is obtainable by either of the in-oxygen reactive sputtering method and the sputtering method with a partial oxide as a target. The saturation magnetization, too, is an important parameter, this being controllable through the adjustment of oxidization ratio. The higher the saturation magnetization, the more the low-density reproduction output tends to increase, the recording density to lower and the noise to increase. It is important that the saturation magnetization should be adjusted properly, for it also influences the coercive force, the preferable value thereof being in a range of 300–700 emu/cm$^3$. The in-plane coercive force increases with an increasing thickness of the medium. The reproduction output is in proportion to the thickness of the medium which, however, is preferred to be in a range of 1,000–5,000 Å, for the head touch tends to get worse if the medium formed is too thick.

According to the present invention, sputtering is conducted so that the particles to be sputtered are incident on the substrate substantially perpendicular. Hitherto, a film of high in-plane coercive force has been obtained by inclined vapor deposition method and there is a problem that the deposition efficiency of the element is poor. According to the present invention, however, the incident direction is substantially perpendicular to the substrate, which contributes to an improvement of the aforementioned deposition efficiency. Another problem is that the film formed by inclined vapor deposition has a uni-directional anisotropy, which is acceptable for use as tapes but not good for use as floppy discs and the like. However, the magnetic film obtained in the present invention is in-plane isotropic and is well usable as a rotary disc such as floppy discs and the like.

FIG. 1 shows the magnetization curve for a typical magnetic film obtainable according to the present invention (magnetic film obtained in Example 1 described later). The curve shows that the in-plane coercive force is higher than the perpendicular coercive force, which proves the magnetic film is an in-plane film.

The medium of the present invention, being of a partial oxide, is stiff and is improved in durability or resistance to sliding against the head. It is, however, preferable to form a protective film or a coated film of a lubricant without further increasing the space between the head and the medium, for it increases the running property as well as durability of the head.

It is effective for improving the surface smoothness of a medium as well as its touch to the head to form a non-magnetic layer of chromium and the like in the process of preparation of the magnetic film preferably with a low power. It is also effective for increasing the in-plane coercive force of the film of a partial oxide of cobalt. Further, it is effective for increasing the stiffness of the medium as a whole and may be preferable in some cases, i.e. depending on the intended use, since the running durability of the medium is improved thereby.

Recording and reproduction are well feasible by the use of a ring type head. It is well known that the reproduction output is in proportion to the product of the coercive force, the saturation magnetization and the thickness of the magnetic film when recording and reproduction are done by the use of a ring-shaped head, as demonstrated by the examples described later. The higher the coercive force, the higher the reproduction output.

As the core material of the ring type head, there are included a Zn-Mn ferrite, Zn-Mn ferrite with a gap therein filled with an inserted material of high saturation magnetic flux density or of high permeability such as amorphous alloy or Sendust and the like, but preferred is a head of high saturation magnetic flux density, for example, not less than 4,500 Gauss.

Needless to say, media with third elements such as Ni, Cr, Al, Nb, Mn, Ta, W, Mo, Zr, Ti, V and Si added to the film of partially oxidized cobalt of the magnetic film for an improvement of corrosion resistance are also included in the present invention.

The aforementioned magnetic recording medium is high in in-plane coercive force as well as reproduction output, low in noise level and high in S/N ratio. There is, however, a problem about its reproducibility, i.e., its coercive force possibly being low in some cases depending on the preparation conditions. This is due to a phenomenon that the in-plane coercive force is gradually lowered to become a perpendicularly magnetized film while sputtering is repeated under the same conditions for a magnetic film intended to be in-plane. This problem, however, can be solved by providing an underlayer comprising Cr, Fe or an Fe-Co alloy in the course of sputtering. Provision of a Cr-underlayer enables preparation of a film of partially oxidized cobalt of not less than 500 Oe or even 1,000 Oe in in-plane coercive force. An underlayer comprising Fe or an Fe-Co alloy provides a film of partially oxidized cobalt not less than 500 Oe in in-plane coercive force, moreover, a film of partially oxidized cobalt not less than 500 Oe in in-plane coercive force, not less than 0.6 in in-plane squareness ratio and large in energy product is obtainable.

Figure 2:
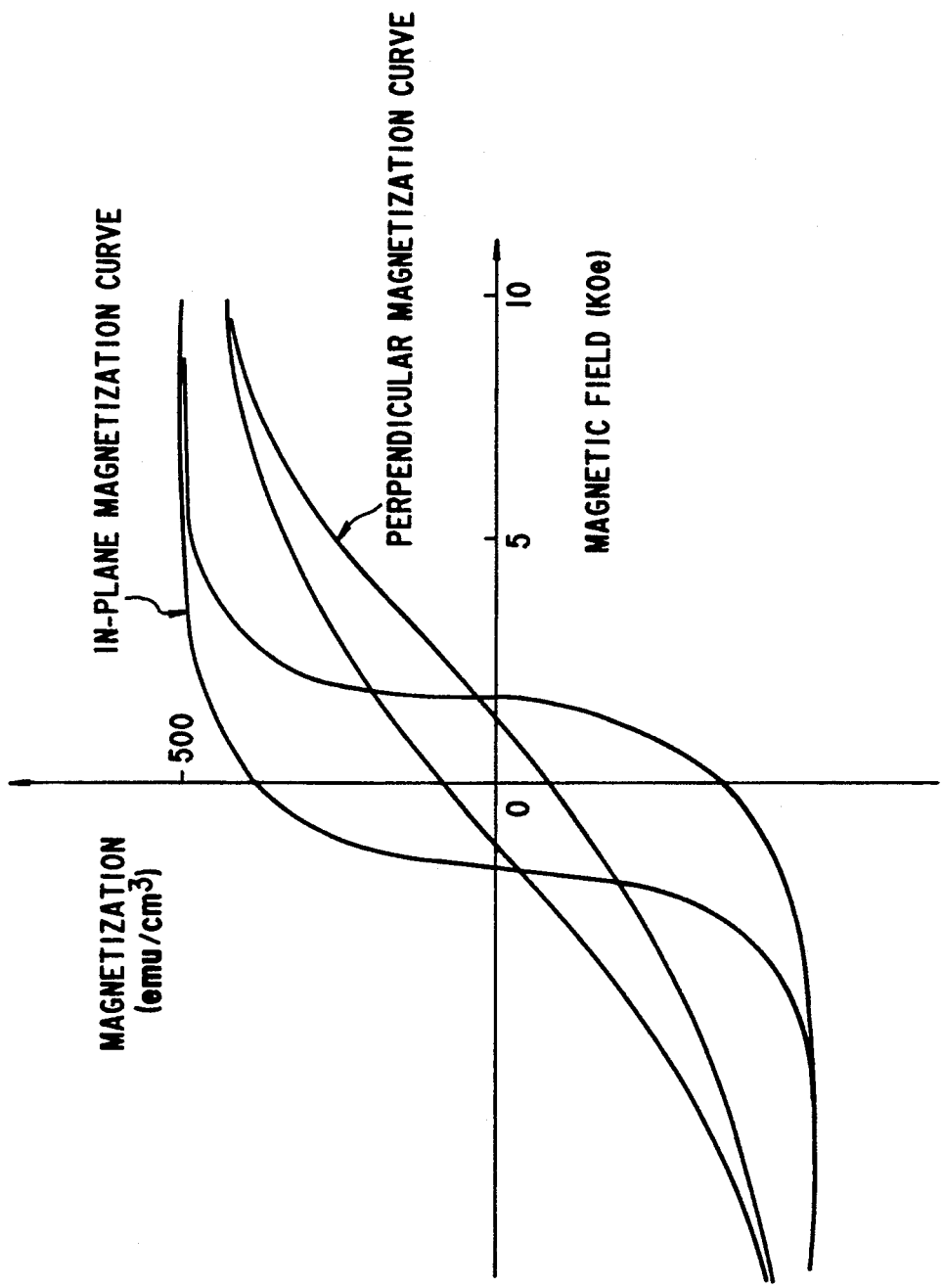
FIG. 2 shows another magnetization curve for a film of partially oxidized cobalt prepared in Example 12 of the present invention.
Figure 3:
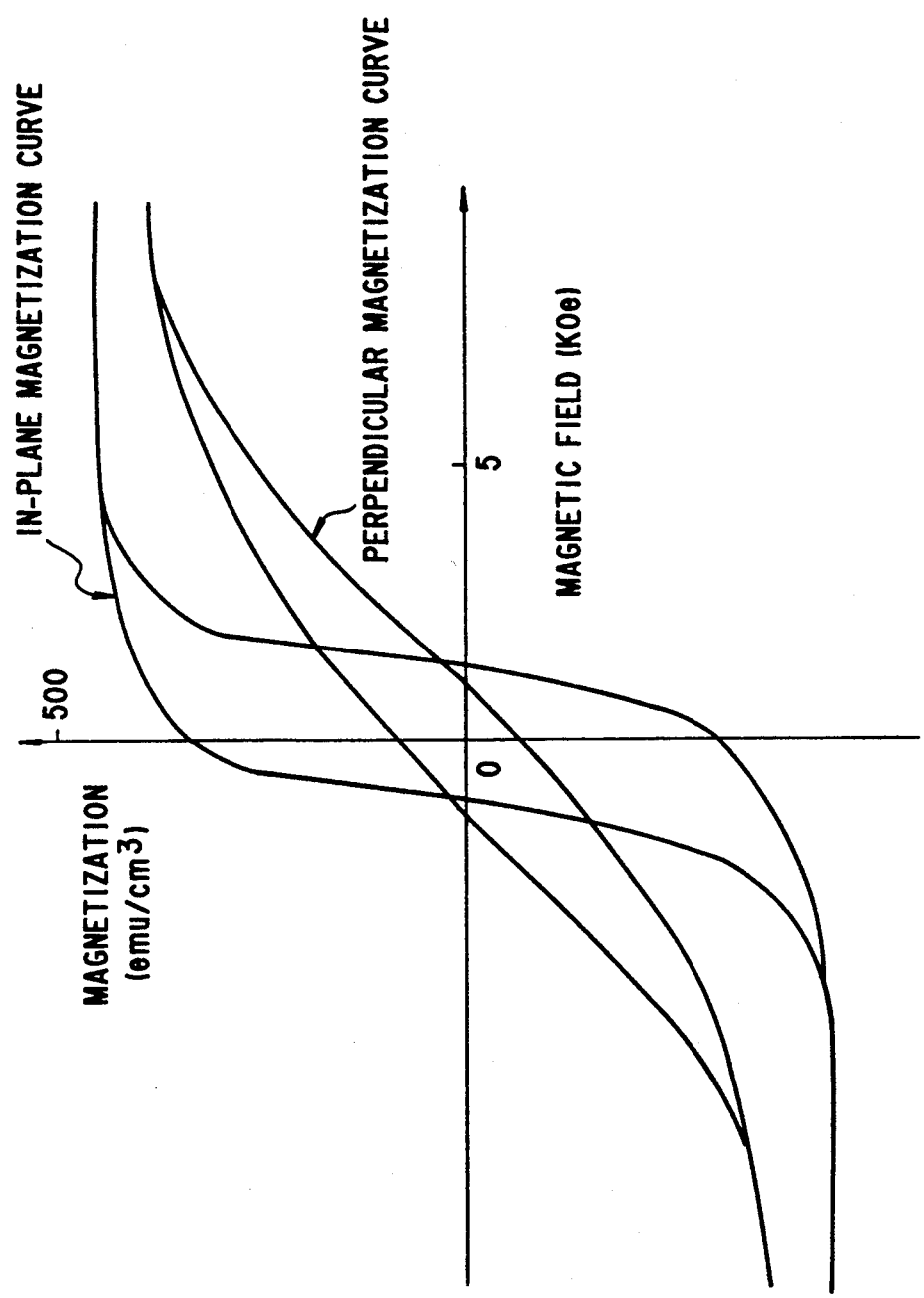
FIG. 3 shows a still another magnetization curve for a film of partially oxidized cobalt prepared in Example 21 of the present invention.

FIGS. 2 and 3 show the magnetization curves for typical magnetic films obtainable according to the present invention (magnetic films obtained in Examples 12 and 21 described later). These curves show that the in-plane coercive force Hc $\parallel$ is higher than the perpendicular coercive force Hc$\perp$ and the squareness ratio (in-plane residual magnetization Mr $\parallel$ /saturation magnetization Ms) is larger than (perpendicular residual magnetization Mr$\perp$/saturation magnetization Ms) and that this magnetized film is in-plane anisotropic film.

The magnetizing property of this film of partially oxidized cobalt is influenced by the conditions of sputtering of the underlayer. In cases where the underlayer is of Cr, the argon gas pressure is below 5 m Torr and preferably in a range of 0.5-5 mTorr, or high in a range of 12-20 mTorr. Under such conditions, the chromium underlayer is sufficiently effective if the thickness of chromium is in a range of 10-100 Å. Even if the argon gas pressure is 5-10 mTorr, a partially oxidized film of cobalt high in in-plane anisotropy is obtainable if the chromium thickness is increased to 100-500 Å. When the underlayer is of Fe or an Fe-Co alloy, the proper argon gas pressure is 0.5-15 mTorr. The composition of the Fe-Co alloy is preferably Fe$_{l-x}$ Co$_x$ ($0 \leq x \leq 0.8$), which means 0-80 cobalt atom %. Using cobalt alone results in lowering of coercive force. Under such conditions, sufficient effects are attainable with the underlayer thickness in a range of 10-500 Å. When the underlayer thickness is more than 500 Å, the coercive force is markedly lowered, while the in-plane squareness ratio is increased.

It is important that, prior to sputtering, the inside of the sputtering container should have a high vacuum, for, otherwise, the layer formed is likely to have a perpendicular magnetic anisotropy. In the method of the present invention, too, it is necessary to raise the degree of vacuum, but the method for forming the chromium underlayer features that it enables the stable formation of a magnetic film high in in-plane anisotropy even under an insufficient degree of vacuum.

Thus, a magnetic recording medium high in in-plane coercive force and reproduction output, low in noise and high in C/N ratio is obtained, when an underlayer comprising Cr, Fe or an Fe-Co alloy is formed under a magnetic film comprising a partially oxidized cobalt.

Then, the shortcoming of its reproduction output being lower than that of a Co-Cr alloy medium comprising a perpendicularly magnetic recording medium including a film of partially oxidized metal in combination with a ring type head can be overcome by provision of a perpendicular magnetic anisotropic film comprising a partially oxidized metal on the magnetic film of partially oxidized cobalt.

As the perpendicular magnetic anisotropic film of a partial oxide in the present invention, perpendicular magnetic anisotropic films of a partially oxidized iron-cobalt alloy and a partially oxidized cobalt are preferred.

First, a preparation method for magnetic anisotropic film of partially oxidized iron-cobalt alloy (Fe-Co-O) will be described. The perpendicular magnetic film of Fe-Co-O, too, is obtainable by either reactive sputtering or sputtering from a mixed target of an Fe-Co alloy and its oxide. Both DC sputtering and high-frequency sputtering are feasible. Preferred preparing conditions for these films are $-30°-200°$ C. in substrate temperature, 1-10 mTorr in argon gas pressure and 100-10,000 Å/min. in depositing rate. The proper substrate temperature is determined with the thermal resistance of the substrate and the profitability of using a heating or cooling device. The lower the argon gas pressure, the higher the perpendicular magnetic anisotropy and the higher the strength of the resulting film, but if the argon gas pressure is too low, no stable discharge is attainable. As to the depositing rate, it is preferred to be higher for economic reasons but the upper limit thereof is determined by the technological level of the devices used in this field of industry.

The magnetic properties of the perpendicular magnetic anisotropic film of partially oxidized Fe-Co (Fe-Co-O), especially saturation magnetization, perpendicular magnetic anisotropy and coercive force are determined mainly by cobalt concentration and oxygen concentration. As to the cobalt concentration, a medium high in perpendicularly magnetic anisotropy is obtainable when it is 30-70 atomic % [Co/(Co+Fe)]. Since the maximum perpendicular magnetic anisotropy is exhibited in a vicinity of 40 atomic %, a magnetic film highest in both saturation magnetization and coercive force is obtainable under this condition. As to the oxidation ratio, another important and decisive factor, 50-85% is preferable. This oxidation ratio is a determining factor for saturation magnetization, perpendicular magnetic anisotropy and coercive force. If the oxidation ratio is increased, the saturation magnetization is lowered progressively and linearly, while the perpendicular magnetic anisotropy becomes higher. The coercive force show a tendency similar to that of the perpendicularly magnetic anisotropy. With the medium of the present invention, the reproduction output is in proportion to the saturation magnetization, and the recording density D$_{50}$ is in proportion to the perpendicular magnetic anisotropy, and therefore, both saturation magnetization and perpendicular magnetic anisotropy are necessarily to be high for obtaining high reproduction output and high recording density, and this means that the oxidization ratio has an optimum value. If the coercive force is low, it is subject to an influence of the recording demagnetization, while, if it is too high, it results in an increased writing difficulty and in deterioration of the overwrite property. For this reason, it is important that both coercive force and perpendicular magnetic anisotropy be adjusted properly according to the head used. The oxidation ratio is controllable through the adjustment of oxygen supply rate during sputtering or of the partial pressure of oxygen. Through proper adjustment of the contents of both cobalt and oxygen, it is possible to obtain a magnetic film with its saturation magnetization Ms preferably in a range of 300-950 emu/cm$^3$, its perpendicular anisotropic magnetic field preferably in a range of 3-9 kOe and its perpendicular coercive force preferably in a range of 200-1,500 Oe. The thickness of the perpendicular anisotropic film of Fe-Co-O, too, is an important factor determining its recording and reproducing property, and it is preferably in a range of 200-3,000 Å, more preferably in a range of 500-2,000 Å, though depending on the type of the head used. The reproduction output voltage and the recording density are both bound to decrease, if the aforementioned film thickness is off the above range on the higher or the lower side.

Then, the perpendicular magnetic anisotropic film of partially oxidized cobalt (Co-O) used is formed in the same way as in the formation of a film of partially oxidized cobalt used as an underlayer. Sputtering may be performed by either of the high-frequency sputtering method and the DC sputtering method, but the argon gas pressure may preferably be higher for a film of high perpendicular magnetic anisotropy. The magnetic film so prepared may preferably be 300-950 emu/cm$^3$ in saturated magnetization, 3-9 KOe in perpendicular magnetic anisotropy and 200-1,500 Oe in coercive force.

The bilayer medium is stiff in the surface layer because it is made of a partial oxide, low in friction coefficient and excellent in durability against sliding of the head. It is, however, preferable to form a protective film or a coated film of a lubricant if it does not cause an increase of the space between the head and the medium, for it means an improvement of the running performance as well as durability of the head.

It is also preferable to provide a non-magnetic layer of Cr, Fe, an Fe-Co and the like as the lowermost layer, i.e., between the substrate and the lower magnetic film, especially by a low-power sputtering method, for it is effective not only to raise the surface smoothness to improve the head touch, but also to increase the stiffness of the medium as a whole and to improve running durability of the medium.

EXAMPLE 1

A film of partially oxidized cobalt was deposited on a polyimide film 50 $\mu$m in thickness by a high-frequency magnetron sputtering method. A target of Co:CoO=6:4 (molar ratio) was placed at the lower part, horizontally and opposite to the upper substrate. The sizes of the target and the substrate are both 6 inches in diameter. Sputtering was carried out for 6 minutes by a high-frequency magnetron sputtering method under an argon gas pressure of 2 mTorr and a sputtering power of 450 W and the film thus formed was 3,000 Å in thickness. The saturation magnetization of the film was 460 emu/cm$^3$ and the coercive force measured parallel to its surface was 1,320 Oe. The squareness ratio was 0.6. A disc 3.5 inches in diameter was cut out of the film and its recording and reproducing property was measured. The result of measurement using a ring type head was as shown in Table 1.

EXAMPLE 2, CONTROL EXAMPLES 1 AND 2

Sputtering was carried out in the same way as in Example 1 except that a direct current (DC) sputtering method was used instead of the high-frequency (RF) sputtering method and the argon gas pressure was set at two levels, namely 2 mTorr and 10 mTorr, and the results were also as shown in Table 1.

As seen from Table 1, the in-plane coercive force is raised, when the RF sputtering method is used and is done under a low pressure.

TABLE 1

| | Sputtering conditions | | | | Magnetic properties | | | | | Recording and reproducing properties Reproducing output at 81 kfci* ($\mu$V) |
|---|---|---|---|---|---|---|---|---|---|---|
| | Target | Ar pressure (mTorr) | RF/DC | Power (W) | Time (min) | Saturation magnetization (emu/cm$^3$) | In-plane coercive force (Oe) | Perpendicular coercive force (Oe) | Perpendicular anisotropic magnetic field | Thickness (Å) | |
| Example 1 | Co:CoO (6:4) | 2 | RF | 450 | 6 | 460 | 1320 | 1060 | 2.4 | 3000 | 19 |
| Cont. Ex. 1 | Co:CoO (6:4) | 10 | " | " | " | 520 | 390 | 540 | 3.1 | " | 14 |
| Example 2 | Co:CoO (6:4) | 2 | DC | " | " | 550 | 780 | 720 | 4.1 | 4800 | 17 |
| Cont. Ex. 2 | Co:CoO (6:4) | 10 | " | " | " | 480 | 450 | 840 | 4.7 | 4300 | 9 |

*Head used: Sendust MIG head, track width: 25 $\mu$m, gap length: 0.25 $\mu$m, running speed: 1m/sec, coil turn: 20

Media improved in corrosion resistance by addition of third elements such as Ni, Cr, Al, Nb, Mn, Ta, W, Mo, Zr, Ti, V and Si to the perpendicular magnetic anisotropic film of Co-O or Fe-Co-O, too, are, needless to say, included in the scope of the present invention.

The present invention is described below more specifically by way of examples, but, needless to say, the invention is by no means to be limited thereto or thereby.

EXAMPLE 3-6, CONTROL EXAMPLE 3

Two kinds of partially oxidized targets were used and magnetic films different in degree of oxidation were obtained by further varying the amount of oxygen added. That is, by varying the degree of oxidation, magnetic films different in saturation magnetization were obtained. The results were as shown in Table 2.

From the results of Table 2, it is understood that media high in in-plane coercive force are obtained within a range of 300-700 emu/cm$^3$ in saturation magnetization.

TABLE 2

| | Sputtering conditions | | | | | | Magnetic properties | | | |
|---|---|---|---|---|---|---|---|---|---|---|
| | Target | Ar pressure (mTorr) | O$_2$ flow rate (ccm) | RF/DC | Power (W) | Time (min) | Saturation magnetization (emu/cm$^3$) | In-plane coercive force (Oe) | Perpendicular coercive force (Oe) | Thickness (Å) |
| Cont. Ex. 3 | Co—CoO (8:2) | 2 | 0 | RF | 450 | 5'30" | 750 | 330 | 300 | 2500 |
| Example 3 | Co—CoO (8:2) | " | 1 | " | " | " | 660 | 510 | 500 | " |

TABLE 2-continued

| | | Sputtering conditions | | | | | Magnetic properties | | |
| --- | --- | --- | --- | --- | --- | --- | --- | --- | --- |
| | Target | Ar pressure (mTorr) | O$_2$ flow rate (ccm) | RF/DC | Power (W) | Time (min) | Saturation magnetization (emu/cm$^3$) | In-plane coercive force (Oe) | Perpendicular coercive force (Oe) | Thickness (Å) |
| 4 | Co—CoO (6:4) | " | 0 | " | " | " | 440 | 1065 | 975 | " |
| 5 | Co—CoO (6:4) | " | 0.5 | " | " | " | 270 | 1035 | 810 | " |
| 6 | Co—CoO (6:4) | " | 1 | " | " | " | 220 | 855 | 570 | " |

EXAMPLES 7-11

Magnetic films were obtained in the same way as in Example 1 except that the argon gas pressure in sputtering was varied. The results were as is shown in Table 3.

TABLE 3

| | | Sputtering conditions | | | | Magnetic properties | | | |
| --- | --- | --- | --- | --- | --- | --- | --- | --- | --- |
| Example | Target | Ar pressure (mTorr) | RF/DC | Power (W) | Time (min) | Saturation magnetization (emu/cm$^3$) | In-plane coercive force (Oe) | Perpendicular coercive force (Oe) | Thickness (Å) |
| 7 | Co—CoO (6:4) | 1.0 | RF | 600 | 4 | 550 | 1040 | 850 | 2000 |
| 8 | Co—CoO (6:4) | 2.0 | " | " | " | 545 | 1040 | 850 | " |
| 9 | Co—CoO (6:4) | 4.0 | " | " | " | 550 | 1000 | 815 | " |
| 10 | Co—CoO (6:4) | 6.0 | " | " | " | 540 | 760 | 700 | " |
| 11 | Co—CoO (6:4) | 8.0 | " | " | " | 530 | 500 | 540 | " |

EXAMPLE 12

A chromium underlayer and a film of partially oxidized cobalt was formed in that order by the high-frequency magnetron sputtering method. Equipment for sputtering was used, one having in its vacuum vessel a target comprising Cr and a target comprising Co:-CoO=6:4 (molar ratio), each 6 inches in diameter. A polyimide film 30 μm in thickness was used as a substrate. The target and the substrate holder are equal in dimensions and arranged to oppose to each other 7 cm apart. The sputtering particles were incident substantially perpendicular on the substrate. Films of chromium and partially oxidized cobalt were formed by sputtering in that order without breaking vacuum.

Sputtering was continued for 18 seconds at an argon gas flow rate of 7.5 ccm, under an argon gas pressure of 1 mTorr and with a high-frequency power of 250 W, and a chromium underlayer 100 Å thick was obtained. Thereafter, sputtering was continued for 3 minuters at an argon gas flow rate of 20 ccm, under argon gas pressure of 3 mTorr and with a high-frequency power of 600 W, and a partially oxidized film of cobalt 2,280 Å thick was obtained. The saturation magnetization was 516 emu/cm$^3$, the coercive force measured parallel to the film surface was 1,660 Oe and the in-plane squareness ratio was 0.74. The sputtering conditions are shown in Tables 4 and 5 and the magnetic properies are shown in Table 6. The magnetization curve is shown in FIG. 2.

EXAMPLES 13 AND 14, CONTROL EXAMPLE 4

These examples and control example were carried out in the same way as in Example 12 except for the chromium sputtering time and the thickness of the chromium underlayer are Varied. The results were as shown in Tables 4, 5 and 6, respectively.

EXAMPLES 15-18, CONTROL EXAMPLE 5

These examples and control example were carried out in the same was as in Example 12, except that the argon gas pressure was changed to 2, 5, 10 and 15 mTorr, deposition was continued for 6 seconds with a sputtering power of 500 W, and that the partially oxidized film of cobalt was formed by deposition for 2 minutes with a power of 900 W. In Control Example 5, the chromium underlayer was dispensed with. The results are as shown in Tables 4, 5 and 6.

EXAMPLES 19 AND 20

These examples were carried out in the same way as in Example 12 except that the sputtering of chromium Was carried out under an argon gas pressure of 10 mTorr, and that the sputtering time was changed to vary the thickness of the chromium underlayer. The results were as shown in Tables 4, 5 and 6.

TABLE 4

| | Sputtering conditions of chromium underlayer | | | | |
| --- | --- | --- | --- | --- | --- |
| | Degree of vaccum (Torr) | Ar pressure (mTorr) | Power (W) | Time (seconds) | Thickness (Å) |
| Cont. Ex. 4 | 2.5 × 10$^{-6}$ | 1 | 250 | 0" | 0 |
| Example 13 | " | " | " | 6" | 33 |
| Example 14 | " | " | " | 12" | 67 |
| Example 12 | " | " | " | 18" | 100 |
| Cont. Ex. 5 | 6 × 10$^{-6}$ | — | — | — | — |
| Example 15 | " | 2 | 500 | 6" | 67 |
| Example 16 | " | 5 | " | " | " |
| Example 17 | " | 10 | " | " | " |
| Example 18 | " | 15 | " | " | " |
| Example 19 | 3 × 10$^{-6}$ | 10 | 250 | 12" | 67 |
| Example 20 | " | " | " | 30" | 167 |

TABLE 5

| | Sputtering conditions of partially oxidized cobalt film | | | |
|---|---|---|---|---|
| | Ar pressure (mTorr) | Power (W) | Time (min) | Thickness (Å) |
| Cont. Ex. 4 | 3 | 600 | 3 | 2440 |
| Example 13 | " | " | " | 2490 |
| Example 14 | " | " | " | 2430 |
| Example 12 | " | " | " | 2280 |
| Cont. Ex. 5 | 2.2 | 900 | 2 | 2120 |
| Example 15 | " | " | " | 2120 |
| Example 16 | " | " | " | 2040 |
| Example 17 | " | " | " | 2000 |
| Example 18 | " | " | " | 1940 |
| Example 19 | 3 | 600 | 3 | 2580 |
| Example 20 | " | " | " | 2740 |

TABLE 6

| | Magnetic properties | | | | |
|---|---|---|---|---|---|
| | Saturation magnetization ($emu/cm^3$) | Coercive force (Oe) ⊥ | Coercive force (Oe) ∥ | In-plane squareness ratio (−) | Energy product ($Kerg/cm^3$) |
| Cont. Ex. 4 | 468 | 1040 | 1070 | 0.47 | 235 |
| Example 13 | 503 | 1040 | 1200 | 0.61 | 368 |
| Example 14 | 530 | 1060 | 1460 | 0.70 | 542 |
| Example 12 | 516 | 1140 | 1660 | 0.74 | 634 |
| Cont. Ex. 5 | 508 | 1150 | 700 | 0.45 | 160 |
| Example 15 | 513 | 960 | 980 | 0.61 | 307 |
| Example 16 | 503 | 1000 | 800 | 0.47 | 189 |
| Example 17 | 506 | 1040 | 770 | 0.45 | 175 |
| Example 18 | 478 | 1130 | 1040 | 0.51 | 253 |
| Example 19 | 546 | 1240 | 1000 | 0.42 | 229 |
| Example 20 | 522 | 1160 | 1240 | 0.55 | 356 |

Note:
⊥: Perpendicular coercive force
∥: In-plane coercive force

From the above Tables 4, 5 and 6, it is understandable that a magnetic film high in-plane anisotropy is obtainable by providing a chromium underlayer below the magnetic film of partially oxidized cobalt. The magnetic recording medium thus prepared is high in reproduction output, high in recording density and excellent in low-noise and durability.

EXAMPLE 21

An Fe-Co alloy ($Fe_{40}Co_{60}$) underlayer and a film of partially oxidized cobalt were formed in that order by sputtering by the high-frequency magnetron sputtering method. Equipment for sputtering was used, one having targets of 6 inches in diamater $Fe_{40}Co_{60}$ and Co:-CoO=6:4 (molar ratio) in the same vacuum vessel. A polyimide film 30 μm in thickness was used as a substrate. The target and the substrate holders were of the same dimensions, and were arranged opposed to each other with a distance of 7 cm therebetween.

The sputtering particles were sputtered substantially perpendicular to the substrate. The $Fe_{40}Co_{60}$ alloy underlayer and the film of partially oxidized cobalt were formed in that order by sputtering without breaking vacuum.

The argon gas was introduced at a flow rate of 7.5 ccm when the degree of vacuum in the sputtering chamber reached $1.2 \times 10^{-6}$ Tort until the argon gas pressure reached 2.3 Torr. Sputtering was continued for 12 seconds with a high-frequency power of 250 W to form an $Fe_{40}Co_{60}$ underlayer 90 Å thick. Then, sputtering was continued for 3 minutes at a flow rate of 20 ccm under an argon gas pressure of 5 mTorr and with a high-frequency power of 600 W to form a partially oxidized cobalt film of 2,740 Å thick. This film thus obtained was 450 $emu/cm^3$ in saturation magnetization, 1,000 Oe in coercive force as measured parallel to the film surface and 0.72 in in-plane squareness ratio. The sputtering conditions were shown in Tables 7 and 8 and the magnetic properies were shown in Table 9. The magnetization curve was shown in FIG. 3.

EXAMPLES 22–24

These examples were carried out in the same way as in Example 21, except that the sputtering pressure for formation of the $Fe_{40}Co_{60}$ alloy underlayer was varied. The results were as shown in Tables 7, 8 and 9. These results show that an influence of the argon gas pressure is small.

EXAMPLES 25 AND 26, CONTROL EXAMPLE 6

These examples and control example were carried out in the same way as in Example 21, except that the argon gas pressure for formation by sputtering of the $Fe_{40}Co_{60}$ alloy underlayer was set at 1 mTorr and that the sputtering time was varied to change the thickness of the $Fe_{40}Co_{60}$ alloy underlayer. The results were as shown in Tables 7, 8 and 9.

From the tabulated results, it is understood that the proper thickness of the $Fe_{40}Co_{60}$ alloy underlayer is 100 Å or so, resulting in a decrease of coercive force if it is thicker.

EXAMPLES 27 AND 28, CONTROL EXAMPLE 7

These examples and control example were carried out in the same way as in Example 21 except that the degree of vacuum reached prior to sputtering was raised to $3 \times 10^{-6}$ Torr, $Fe_{60}Co_{40}$ was used as an underlayer alloy and the thickness of the underlayer was varied. The results were as shown in Tables 7, 8 and 9.

The results show that the higher the degree of vacuum, the higher the in-plane anisotropy.

EXAMPLE 29

An Fe-Co alloy underlayer was prepared in the same way as in Example 21 and subsequently the partially oxidized film of cobalt was formed by a reactive sputtering in an oxygen atmosphere. Colbalt as a target and argon gas was introduced at a flow rate of 20 ccm for its pressure to be adjusted to 3 mTor. Further, 8 ccm of oxygen was introduced. Under these conditions, sputtering was continued for 1 minute at 900 W and a partially oxidized film of cobalt 2,240 Å thick was obtained. The results were as shown in Tables 7, 8 and 9.

From the tabulated results, it is understood that a partially oxidized film of cobalt is properly obtained also by the reactive sputtering.

CONTROL EXAMPLE 8

Cobalt was used as an underlayer, and sputtering was carried out for 6 seconds under an argon gas pressure of 5 mTorr and with a power of 500 W. Then, a partially oxidized film of cobalt was obtained by the reactive sputtering in the same way as in Example 29. The results were as shown in Tables 7, 8 and 9.

From the tabulated results, it is understood that a partially oxidized film of cobalt high in in-plane anisotropy is not obtainable when the substrate is of cobalt.

EXAMPLE 30

An underlayer of iron was used, and sputtering was carried out for 6 seconds under an argon pressure of 5 mTorr and a power of 500 W. Then, in the same way as in Example 29, a partially oxidized film of cobalt was obtained by the reactive sputtering. The results were as shown in Tables 7, 8 and 9.

From the tabulated results, it is understood that a partially oxidized film of cobalt is obtainable even when the underlayer is of iron.

TABLE 7

| | Sputtering conditions of Fe, Fe—Co or Co underlayer | | | | | |
|---|---|---|---|---|---|---|
| | Degree of vaccum (Torr) | Composition | Ar pressure (mTorr) | Power (W) | Time (seconds) | Thickness (Å) |
| Example 21 | $1.2 \times 10^{-5}$ | $Fe_{40}Co_{60}$ | 2.3 | 250 | 12 | 90 |
| Example 22 | " | " | 5 | " | " | " |
| Example 23 | " | " | 10 | " | " | " |
| Example 24 | " | " | 15 | " | " | " |
| Cont. Ex. 6 | $9 \times 10^{-6}$ | " | 1 | " | 0 | 0 |
| Example 25 | " | " | " | " | 12 | 90 |
| Example 26 | " | " | " | " | 18 | 130 |
| Cont. Ex. 7 | $3 \times 10^{-6}$ | $Fe_{60}Co_{40}$ | 2.3 | " | 0 | 0 |
| Example 27 | " | " | " | " | 12 | 90 |
| Example 28 | " | " | " | " | 18 | 130 |
| Example 29 | $9 \times 10^{-6}$ | $Fe_{40}Co_{60}$ | 5 | 500 | 6 | 90 |
| Example 30 | " | Fe | " | " | " | " |
| Cont. Ex. 8 | $2 \times 10^{-6}$ | Co | " | " | " | " |

TABLE 8

| | Sputtering conditions of partially oxidized cobalt film | | | | | |
|---|---|---|---|---|---|---|
| | Target | $O_2$ flow rate (ccm) | Ar pressure (mTorr) | Power (W) | Time (min) | Thickness (Å) |
| Example 21 | $Co_{60}CoO_{40}$ | — | 5 | 600 | 3 | 2740 |
| Example 22 | " | — | " | " | " | 2640 |
| Example 23 | " | — | " | " | " | 2600 |
| Example 24 | " | — | " | " | " | 2550 |
| Cont. Ex. 6 | " | — | 3 | " | " | 2500 |
| Example 25 | " | — | " | " | " | 2650 |
| Example 26 | " | — | " | " | " | 2470 |
| Cont. Ex. 7 | " | — | 5 | " | " | 2580 |
| Example 27 | " | — | " | " | " | 2360 |
| Example 28 | " | — | " | " | " | 2690 |
| Example 29 | Co | 8 | " | 900 | 1 | 2240 |
| Example 30 | " | " | " | " | " | 2300 |
| Cont. Ex. 8 | " | " | " | " | " | 2290 |

TABLE 9

| | Magnetic properties | | | | |
|---|---|---|---|---|---|
| | Saturation magnetization | Coercive force (Oe) | | In-plane squareness ratio | Energy product |
| | (emu/cm³) | ⊥ | ∥ | (—) | (Kerg/cm³) |
| Example 21 | 450 | 1080 | 1000 | 0.72 | 324 |
| Example 22 | 443 | 1070 | 860 | 0.64 | 244 |
| Example 23 | 450 | 1200 | 800 | 0.63 | 227 |
| Example 24 | 449 | 1200 | 880 | 0.65 | 257 |
| Cont. Ex. 6 | 355 | 1010 | 970 | 0.51 | 176 |
| Example 25 | 401 | 980 | 930 | 0.69 | 257 |
| Example 26 | 387 | 1020 | 800 | 0.89 | 276 |
| Cont. Ex. 7 | 498 | 1110 | 850 | 0.52 | 220 |
| Example 27 | 484 | 1080 | 1260 | 0.76 | 463 |
| Example 28 | 465 | 1000 | 1020 | 0.73 | 346 |
| Example 29 | 525 | 1000 | 1130 | 0.69 | 409 |
| Example 39 | 510 | 1000 | 1100 | 0.70 | 393 |
| Cont. Ex. 8 | 500 | 970 | 640 | 0.46 | 150 |

Note:
⊥: Perpendicular coercive force
∥: In-plane coercive force

The data shown in Tables 7, 8 and 9 demonstrate that a partially oxidized film of cobalt high in anisotropy is obtainable stably if an underlayer of Fe or Fe-Co alloy is provided under a magnetic layer of partially oxidized cobalt. The magnetic recording medium thus obtained is high in reproduction output, high in recording density, low in noise and excellent in durability.

EXAMPLE 31

On a substrate comprising a 50 μm polyimide film, non-magnetic chromium was first deposited by the high-frequency magnetron sputtering method for formation of the lowermost layer. The polyimide film substrate was cooled from the backside. A chromium disc 6 inches in diameter was used as a target. Sputtering was carried out for 3 minutes and 30 seconds under an argon gas pressure of 15 mTorr and with a sputtering power of 300 W and a film 1,500 Å thick was thus obtained.

Subsequently, a partially oxidized film of cobalt as an underlayer was formed by sputtering. Co:CoO=6:4 (molar ratio) was used as a target. Sputtering was carried out for 2 minutes by the high-frequency magnetron sputtering method under an argon gas pressure of 2 mTorr and with a sputtering power of 450 W and a film 1,000 Å thick was obtained. The saturation magnetization was 550 emu/cm³ and the coercive force, as measured parallel to the film surface was 750 Oe.

Then, a perpendicular magnetic anisotropic film of partially oxidized iron-cobalt alloy was formed by depositing. Co:FeO=6:4 (molar ratio) was used as a target. Sputtering was carried out for 1 minute by the high-frequency magnetron sputtering method under an argon gas pressure of 2 mTorr and with a sputtering power of 900 W and a film 1,000 Å thick was thus obtained. Meanwile, only a partially oxidized iron-cobalt alloy as a perpendicular magnetic anisotropy was deposited on the substrate of polyimide film without providing the non-magnetic chromium lowermost layer and the underlayer magnetic film, and the film so formed turned out to be of 600 emu/cm³ in saturation magnetizarion and 4.0 kOe in perpendicular anisotropic magnetic field. A trilayer film was also formed by depositing on the opposite side of the substrate in exactly the same way.

Figure 4:
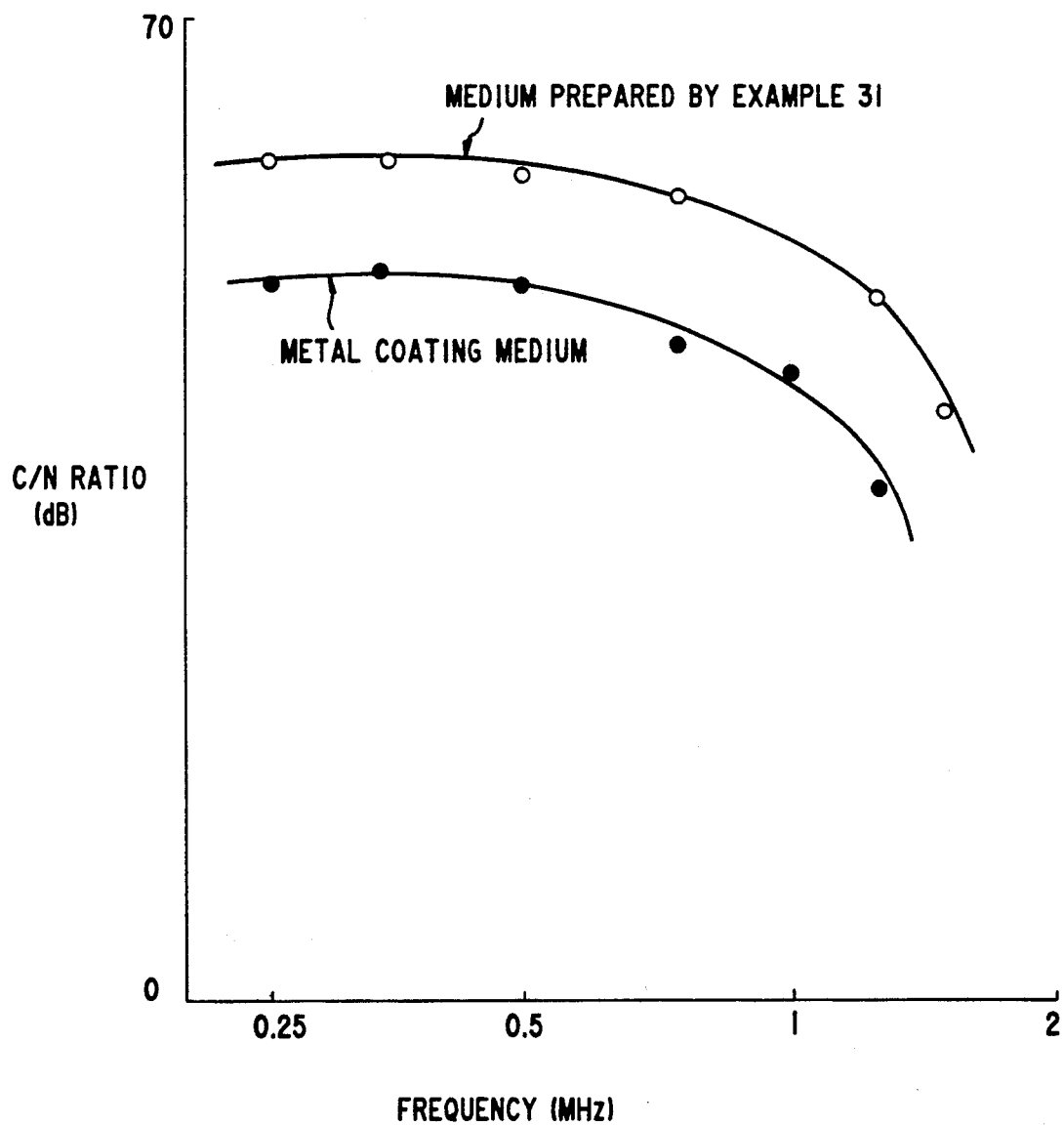
FIG. 4 is a graph showing comparison in C/N ratio of a perpendicular magnetic recording medium comprising a partially oxidized Fe-Co alloy deposited on a film of partially oxidized cobalt as an underlayer, which was prepared in Example 31 of the present invention.

A disc 3.5 inches in diameter was cut out and its recording and reproducing property was measured. As a floppy disc drive, "12 MB, FD 1331" (manufactured by NEC Co., Ltd.) was used. A spectrum analyzer was used for measuring the output. Variation of C/N ratio as a consequence of variation of the recording density was shown in FIG. 4. Measurement was done on 0 side with 120 tracks. 1 MHz is equal to approximately 40 kfci. Measurement was done in a resolution band of 10 KHz. For comparison, data on a metal coating medium TD were also shown in FIG. 4. It is shown that the C/N ratio is improved by some 10 dB in the entire zone.

EXAMPLES 32 AND 33, CONTROL EXAMPLES 9 AND 10

Media not incorporating the film of partially oxidized cobalt or the perpendicular magnetic anisotropic film of oxidized iron-cobalt alloy and those incorporating these in varying thicknesses were prepared in exactly the same way as in Example 31, and the recording and reproducing property of each thereof was measured. The results, including that of Example 31, were as comparison, measurement was taken of a counterpart formed by depositing the perpendicular magnetic isotropic film only on the polyimide film substrate without providing the non-magnetic chromium layer or the underlayer magnetic film and the magnetic property thereof was presumed to be 550 emu/cm$^3$ in saturation magnetization, 4.5 kOe in perpendicular magnetic field, 800 Oe in perpendicular coercive force and 600 Oe in in-plane coercive force. Measurement was taken in the same way as in Example 31 and the results were as shown in Tables 10 and 11.

CONTROL EXAMPLE 11

After forming the lowermost chromium layer in the same way as in Example 31, an iron-cobalt alloy film was used as an underlayer, instead of the partially oxidized film of cobalt. Co:Fe=6:4 (molar ratio) was used as a target and, sputtering was carried out for 15 seconds under an argon gas pressure of 2 mTorr and with a sputtering power of 500 W. A film 200 Å thick was obtained. Then, a perpendicular magnetic anisotropic film of partially oxidized iron-cobalt alloy was obtained in the same way as in Example 33. The results of measurement were shown in Tables 10 and 11, from which it is apparent that this film is inferior in noise as well as C/N ratio.

TABLE 10

| | Lower most layer of Cr (Å) | Sputtering conditions of magnetic films | | | | | | | | | |
|---|---|---|---|---|---|---|---|---|---|---|---|
| | | Underlayer magnetic film | | | | | Perpendicular magnetic anisotropic film | | | | |
| | | Target | Discharge | Power (W) | Ar pressure (mTorr) | Time (min) | Target | Discharge | Power (W) | Ar pressure (mTorr) | Time (min) |
| Example 31 | 500 | Co:CoO = 6:4 | RF | 450 | 2 | 2 | Co:FeO = 6:4 | RF | 900 | 2 | 1 |
| Cont. Ex. 9 | " | — | — | — | — | — | " | " | " | " | 2 |
| Example 32 | " | " | " | " | " | 1 | " | " | " | " | 1.5 |
| Example 33 | " | " | " | " | " | 3 | " | " | " | " | 0.5 |
| Cont.Ex. 10 | " | " | " | " | " | 4 | — | — | — | — | — |
| Example 34 | " | " | " | " | " | 2 | Co:CoO = 6:4 | DC | 300 | 5 | 2 |
| Cont.Ex. 11 | " | Co:Fe = 6:4 | " | 500 | " | 0.25 | Co:FeO = 6:4 | RF | 900 | 2 | 1.5 |

TABLE 11

| | Magnetic properties | | | | | | | Recording properties | |
|---|---|---|---|---|---|---|---|---|---|
| | Underlayer magnetic film | | | Perpendicular magnetic anisotropic film | | | | | |
| | Saturation magnetization (emu/cm$^3$) | In-plane coercive force (Oe) | Thickness (Å) | Saturation magnetization (emu/cm$^3$) | Anisotropic magnetic field(KOe) | Perpendicular coercive force(Oe) | Thickness (Å) | D$_{50}$ (kfci) | C/N* (dB) |
| Example 31 | 550 | 750 | 1000 | 600 | 4.0 | 400 | 1000 | 55 | 60 |
| Cont.Ex. 9 | — | — | — | " | " | " | 2000 | 50 | 45 |
| Example 32 | 550 | 600 | 500 | " | " | " | 1500 | 55 | 58 |
| Example 33 | " | 900 | 1500 | " | " | " | 500 | 52 | 59 |
| Cont.Ex. 10 | " | 1300 | 2000 | — | — | — | — | 38 | 58 |
| Example 34 | " | 750 | 1000 | 550 | 4.5 | 800 | 1000 | 55 | 57 |
| Cont.Ex. 11 | 1800 | 450 | 200 | 600 | 4.6 | 400 | 1500 | 35 | 50 |

*C/N ratio represents values at 0.5 MHz = 20 kfci.

shown in Tables 10 and 11.

EXAMPLE 34

A partially oxidized film of cobalt as an underlayer was prepared in the same way as in Example 31 until the film thickness reached 1000 Å, and then a perpendicular magnetic anisotropic film of partially oxidized cobalt was formed by depositing, instead of a perpendicular magnetic anisotropic film of partially oxidized iron-cobalt alloy. That is, a film 1,000 Å thick was obtained by sputtering for 2 minutes under an argon gas pressure of 5 mTorr and with DC sputtering power of 300 W using the same target for the underlayer magnetic film and the perpendicular magnetic anisotropic film. For As apparent from the above Tables 10 and 11, it is understood that a perpendicular magnetic recording medium with partially oxidized film of cobalt as an underlayer high in in-plane coercive force is excellent in reproduction output, low in noise and generally high in S/N ratio compared with that having no such underlayer. The presence of such underlayer is supposed to create so-called U-shaped magnetization mode to thereby reduce diamagnetic field and to increase the surface leakage of magnetic flux, and moreover, it is supposed to result in contribution of the underlayer itself as a recording layer. It is also supposed that the fact that the entire magnetic layer is composed of fine particle metal dispersion oxide phase, noise is lowered.

What is claimed is:

1. A magnetic recording medium, comprising a magnetic film consisting of Co-O having an in-plane coercive force not less than 500 Oe isotropically provided on a substrate, wherein said magnetic film has an in-plane squareness ratio of not less than 0.6 and wherein saturation magnetization is in a range of 300–700 emu/cm$^3$.

2. The medium according to claim 1, wherein there is further provided an underlayer comprising Cr, Fe or an Fe-Co alloy under the magnetic film consisting of Co-O.

3. The medium according to claim 2, wherein the thickness of the underlayer is in a range of 10–500 Å.

4. The medium according to claim 2, wherein the composition of the Fe-Co alloy is Fe$_{l-x}$ Co$_x$ (0 ≦ x ≦ 0.8).

5. The medium according to claim 1, wherein a perpendicular magnetic anisotropic film comprising a partially oxidized metal is further provided on the magnetic film consisting of Co-O.

6. The medium according to claim 5, wherein an underlayer comprising Cr, Fe or an Fe-Co alloy is further provided under the magnetic film consisting of Co-O.

7. The medium according to claim 5, wherein the partially oxidized metal is a partially oxidized cobalt or a partially oxidized Fe-Co alloy.

8. A method for preparing a magnetic recording medium, wherein a magnetic film consisting of Co-O with its in-plane coercive force not less than 500 Oe isotropically and having an in-plane squareness ratio of not less than 0.6 and saturation magnetization in a range of 300–700 emu/cm$^3$ is deposited by sputtering substantially perpendicularly under a pressure not more than 5 mTorr.

9. The method according to claim 8, wherein the sputtering is carried our by a high-frequency magnetron sputtering method.

10. The method according to claim 8 or 9, wherein an underlayer comprising Cr, Fe or an Fe-Co alloy is formed by sputtering substantially perpendicularly to the substrate, prior to the deposition of the magnetic film consisting of Co-O.

11. The method according to claim 8 or 9, wherein the magnetic film consisting of Co-O is first deposited by sputtering and then a perpendicular magnetic anisotropic film comprising a partially oxidized metal is formed thereon by sputtering.

12. The method according to claim 11, wherein an underlayer comprising Cr, Fe or an Fe-Co alloy is further provided under the magnetic film consisting of Co-O.

* * * * *

UNITED STATES PATENT AND TRADEMARK OFFICE
CERTIFICATE OF CORRECTION

PATENT NO.  : 5,326,637
DATED       : July 5, 1994
INVENTORS   : Shogo Nasu, et al.

It is certified that error appears in the above-identified patent and that said Letters Patent is hereby corrected as shown below:

Column 5, line 31, change "$Fe_{l-x} Co_x$" to read --$Fe_{1-x} Co_x$--.

Column 10, line 5, change "Was" to --was--.

Column 11, line 55, change "$Fe40Co_{60}$" to --$Fe_{40}Co_{60}$--.

Column 12, line 44, change "Colbalt" to --Cobalt--.

Column 17, lines 19-20, change "$Fe_{l-x} Co_x$" to read --$Fe_{1-x} Co_x$--

Signed and Sealed this

Fifteenth Day of November, 1994

Attest:

BRUCE LEHMAN

*Attesting Officer*     *Commissioner of Patents and Trademarks*